US008689254B2

(12) United States Patent  
Abraham et al.

(10) Patent No.: US 8,689,254 B2
(45) Date of Patent: Apr. 1, 2014

(54) TECHNIQUES AND GRAPHICAL USER INTERFACES FOR PREVIEW OF MEDIA ITEMS

(75) Inventors: Tammy Tova Abraham, San Francisco, CA (US); Alexandrea Anderson, Clovis, CA (US); Steve Jobs, Palo Alto, CA (US); Robert H. Kondrk, San Jose, CA (US); Oliver Krevet, San Jose, CA (US); Jeffrey L. Robbin, Los Altos, CA (US); Mike Wiese, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 11/779,167

(22) Filed: Jul. 17, 2007

(65) Prior Publication Data

US 2008/0066102 A1 Mar. 13, 2008

Related U.S. Application Data (60) Provisional application No. 60/825,238, filed on Sep. 11, 2006.

(51) Int. Cl.
G06F 3/00 (2006.01)
G06F 13/00 (2006.01)
H04N 5/445 (2011.01)
H04N 21/472 (2011.01)

(52) U.S. Cl.
CPC .................................. H04N 21/472 (2013.01)
USPC ............................................. 725/38; 725/37

(58) Field of Classification Search
USPC ....................................................... 725/37–43
See application file for complete search history.

(56) References Cited

U.S. PATENT DOCUMENTS

| 5,680,323 A * | 10/1997 | Barnard ........................ 715/720 |
| 5,715,403 A | 2/1998 | Stefik |
| 5,864,868 A | 1/1999 | Contois |
| 5,963,915 A | 10/1999 | Kirsch |
| 5,963,916 A | 10/1999 | Kaplan |
| 6,011,537 A * | 1/2000 | Slotznick ..................... 715/733 |
| 6,226,618 B1 | 5/2001 | Downs |
| 6,233,682 B1 | 5/2001 | Fritsch |

(Continued)

FOREIGN PATENT DOCUMENTS

| EP | 0 927 945 B1 | 7/1999 |
| FR | A 2 827 981 | 1/2003 |

(Continued)

OTHER PUBLICATIONS

Strunk et al., "The Element of Style", Third Edition, 1979, MacMillian Publ. Co., Inc., New York, NY, all pages.

(Continued)

Primary Examiner — Jeremy Duffield
(74) Attorney, Agent, or Firm — Kilpatrick Townsend & Stockton LLP (57) ABSTRACT

Improved techniques and graphical user interfaces for presenting a media item on a computing device are disclosed. In one embodiment, the media item is a video. A video information window can provide a user with information concerning the video and can enable the user to play at least a portion of the video on request. When the video is to be played, the video information window can expand to present a video playback region in which the video is provided when played. The video can be provided with high resolution and appropriate frame size.

9 Claims, 8 Drawing Sheets

(56) References Cited

U.S. PATENT DOCUMENTS

| | | |
|---|---|---|
| 6,236,971 B1 | 5/2001 | Stefik et al. |
| 6,248,946 B1 | 6/2001 | Dwek |
| 6,317,784 B1 | 11/2001 | Mackintosh et al. |
| 6,346,951 B1 | 2/2002 | Mastronardi |
| 6,385,596 B1 | 5/2002 | Ansell et al. |
| 6,446,080 B1 | 9/2002 | Van Ryzin et al. |
| 6,452,609 B1 | 9/2002 | Katinsky et al. |
| 6,731,312 B2 | 5/2004 | Robbin |
| 6,941,324 B2 | 9/2005 | Plastina et al. |
| 6,976,265 B1 | 12/2005 | Yang et al. |
| 7,062,468 B2 | 6/2006 | Hillegass et al. |
| 7,155,436 B2 * | 12/2006 | Hegde et al. ............ 715/276 |
| 7,209,892 B1 | 4/2007 | Galuten et al. |
| 7,228,437 B2 | 6/2007 | Spagna et al. |
| 7,340,451 B2 | 3/2008 | Sacco |
| 7,345,234 B2 | 3/2008 | Plastina et al. |
| 7,358,434 B2 | 4/2008 | Plastina et al. |
| 7,730,418 B2 * | 6/2010 | Wang et al. ............ 715/800 |
| 2002/0002468 A1 | 1/2002 | Geisler et al. |
| 2002/0026575 A1 | 2/2002 | Wheeler et al. |
| 2004/0216036 A1 * | 10/2004 | Chu et al. ............ 715/501.1 |
| 2004/0221308 A1 * | 11/2004 | Cuttner et al. ............ 725/46 |
| 2004/0236957 A1 | 11/2004 | Durand et al. |
| 2004/0243482 A1 | 12/2004 | Laut |
| 2004/0268451 A1 | 12/2004 | Robbin |
| 2005/0021478 A1 | 1/2005 | Gautier et al. |
| 2005/0071780 A1 | 3/2005 | Muller et al. |
| 2005/0193094 A1 | 9/2005 | Robbin et al. |
| 2006/0064645 A1 * | 3/2006 | Neven et al. ............ 715/753 |
| 2006/0195462 A1 * | 8/2006 | Rogers ............ 707/100 |
| 2007/0038567 A1 * | 2/2007 | Allaire et al. ............ 705/50 |
| 2007/0055937 A1 * | 3/2007 | Cancel et al. ............ 715/704 |
| 2007/0166687 A1 | 7/2007 | Bell |
| 2007/0288864 A1 * | 12/2007 | Keereepart et al. ............ 715/790 |

FOREIGN PATENT DOCUMENTS

| | | |
|---|---|---|
| JP | 11-161717 A | 6/1999 |
| JP | 2002-99466 | 4/2002 |
| JP | 2002-108881 A | 4/2002 |
| JP | 2002-116933 A | 4/2002 |
| JP | 2002-123264 | 4/2002 |
| JP | 2002-164880 | 7/2002 |
| JP | 2002-318873 | 10/2002 |
| JP | 2003-50745 | 2/2003 |
| WO | WO 99/27681 A | 6/1999 |
| WO | WO 00/43904 | 7/2000 |
| WO | WO 00/43905 | 7/2000 |
| WO | WO 00/62265 | 10/2000 |
| WO | WO 01/41023 | 6/2001 |
| WO | WO 01/44908 | 6/2001 |
| WO | WO 01/46786 | 6/2001 |
| WO | WO 01/65526 A | 9/2001 |
| WO | WO 02/084444 A3 | 10/2002 |
| WO | WO 03/017213 | 2/2003 |
| WO | WO 03/023786 A2 | 3/2003 |

OTHER PUBLICATIONS

Burton, "Elementary Number Theory", Fourth Edition, 1998, The McGraw-Hill Companies, Inc., all pages.

Defler, "How Networks Work", Bestseller Edition, 1996, Ziff-Davis Press, Emeryville, CA pp. 1-69.

White, "How Computers Work", Millennium Edition, 1999, Que Corporation, Indianapolis, IN, pp. 1-83.

Gralla, "How the Internet Works", Millennium Edition, 1999, Que Corporation, Indianapolis, IN, pp. 1-36.

Muller, "Desktop Encyclopedia of the Internet", 1999, Artech House Inc., Norwood, MA pp. 1-51.

"Shop the First online .99 Store", www.apple.com/music/store/shop.html, downloaded Sep. 24, 2003, pp. 1-2.

"The iTunes Music Store. Downloads Done Right", www.apple.com/music/store, downloaded Sep. 24, 2003, pp. 1-3.

* cited by examiner

TECHNIQUES AND GRAPHICAL USER INTERFACES FOR PREVIEW OF MEDIA ITEMS

CROSS-REFERENCE TO RELATED APPLICATION

This application claims priority to U.S. Provision Application No. 60/825,238, filed Sep. 11, 2006, and entitled "TECHNIQUES AND GRAPHICAL USER INTERFACES FOR PREVIEW OF MEDIA ITEMS," which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

Conventionally, media management application programs operate on personal computers to facilitate storage and playback of media items, such as songs (music) and videos (music videos, movies). One example of a media management application program is iTunes®, produced by Apple Inc.

A media management application program typically enables its user to browse, search and play media items stored on a personal computer. The media management application program can also allow interaction with an online media store (e.g., iTunes® Music Store) to browse, search, preview and purchase media items that are available online from the online media store. Although conventional techniques allow videos to be previewed or played online, such as with streaming video, often a new window for video playback is launched when a video is to be played or previewed. Launching a new window for video playback can be disruptive to the browsing or searching for videos to be purchased. Other disadvantages of conventional approaches, particularly those that do not launch a new window, are that small playback frames and reduced resolution are used for video playback.

Accordingly, there is a need for improved techniques to allow users to play or preview videos available on an online media store.

SUMMARY OF THE INVENTION

The invention pertains to improved techniques and graphical user interfaces for presenting a media item on a computing device. In one embodiment, the media item is a video. A video information window can provide a user with information concerning the video and can enable the user to play at least a portion of the video on request. When the video is to be played, the video information window can expand to present a video playback region in which the video is provided when played. The video can be provided with high resolution and appropriate frame size. The invention is particularly suitable where the video to be played is a preview of a full-length video that is available online for distribution.

The invention can be implemented in numerous ways, including as a method, system, device, apparatus (including graphical user interface), or computer readable medium. Several embodiments of the invention are discussed below.

As a computer-implemented method for playing a digital video asset on a computing device, one embodiment of the invention includes at least the acts of: displaying a video information window having at least a video attribute area and a preview selector, the video attribute area displaying attributes of the digital video asset, and the preview selector facilitating a request to preview the digital video asset; receiving a selection of the preview selector to preview the digital video asset; modifying the video information window to further include a video playback area when the selection of the preview selector is received; and thereafter playing a preview of the digital video asset in the video playback area of the video information window.

As a graphical user interface for playing a digital video asset on a computing device having a display device associated therewith, one embodiment of the invention includes at least a video information window that is displayed on the display device associated with the computing device. The video information window includes a review mode and a preview mode. When in the review mode, the video information window includes at least a video attribute area and a preview selector. The video attribute area displays attributes of the digital video asset, and the preview selector facilitates a request to preview the digital video asset. On selection of the preview selector, the video information window transitions from the review mode to the preview mode. When in the preview mode, the video information window includes at least the video attribute area as well as a video playback area in which a preview of the digital video asset can be displayed. In the review mode, the video information window does not include the video playback area.

As a computer readable medium including at least computer program code for playing a digital video asset on a computing device, one embodiment of the invention includes at least: computer program code for displaying a video information window having at least a video attribute area and a preview selector, the video attribute area displaying attributes of the digital video asset, and the preview selector facilitating a request to preview the digital video asset; computer program code for receiving a selection of the preview selector to preview the digital video asset; computer program code for modifying the video information window to further include a video playback area; and computer program code for playing a preview of the digital video asset in the video playback area of the video information window.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques and graphical user interfaces for presenting a media item on a computing device. In one embodiment, the media item is a video. A video information window can provide a user with information concerning the video and can enable the user to play at least a portion of the video on request. When the video is to be played, the video information window can expand to present a video playback region in which the video is provided when played. The video can be provided with high resolution and appropriate frame size. The invention is particularly suitable where the video to be played is a preview of a full-length video that is available online for distribution.

The invention is particularly useful for reviewing (e.g., browsing) videos available from an online media store, whereby information concerning a video of interest can be presented and a preview of the video can be played. The preview of the video can be provided in-line and with high resolution and appropriate frame size. For example, resolution and format of the frame for the preview can be same as the video itself.

Embodiments of the invention are discussed below with reference to FIGS. 1-6B. However, those skilled in the art will readily appreciate that the detailed description given herein with respect to these figures is for explanatory purposes as the invention extends beyond these limited embodiments.

"Media items," as used herein, is digital data that pertains to at least one of audio, video, or images. Media items are also referred to as digital media assets. The digital data for media items can be referred to as media data or media content. Some examples of specific forms of media items include, but are not limited to, songs, albums, audiobooks, playlists, movies, music videos, photos, computer games, podcasts, audio and/or video presentations, news reports, and sports updates. Video media items include movies, music videos, video presentations, and any other media items having a video characteristic.

Figure 1:
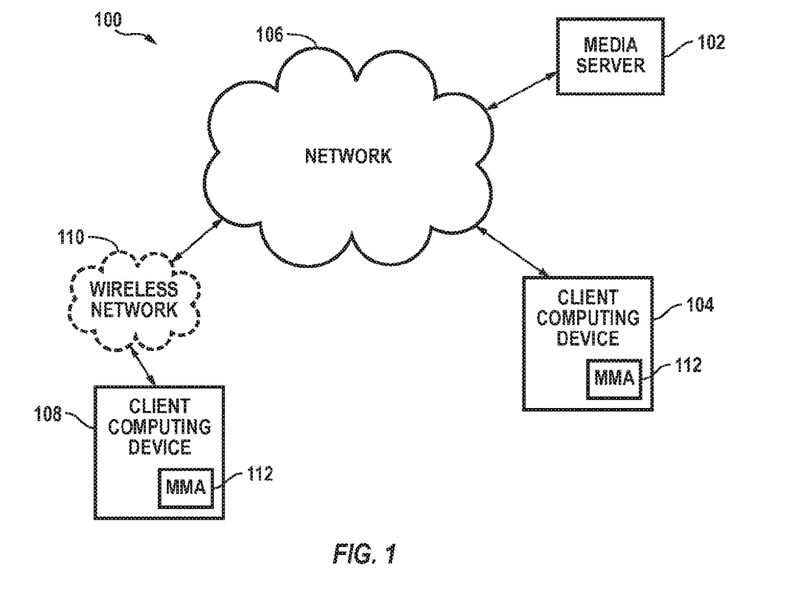
FIG. 1 is a block diagram of a distributed media system according to one embodiment of the invention.

FIG. 1 is a block diagram of a distributed media system 100 according to one embodiment of the invention. The distributed media system 100 includes a media server 102. The media server 102 stores media content that is available for distribution. In one embodiment, the media server 102 hosts an online media store. The online media store can host media content that is able to be browsed, searched, previewed or purchased by various different client computing devices which can interact with the media server 102. In particular, a client computing device 104 illustrated in FIG. 1 can access the media server 102 through a network 106. Both the client computing device 104 and the media server 102 are capable of coupling to the network 106. The network 106 is typically a wired data network that allows data communication between the client computing device 104 (as well as other client computing devices) and the media server 102. In addition, the client computing device 108 can also communicate with the media server 102. However, the client computing device 108 couples to a wireless network 110 that in turn couples to the network 106. Hence, the client computing device 108 can likewise communicate with the media server 102 through the wireless network 110 and the network 106.

A media management application 112 typically operates on the client computing device 104 and on the client computing device 108. The client computing device 104, 108 can, for example, be a desktop computer, a portable computer, or a portable media device (e.g., portable media player). The media management application 112 allows a user of the corresponding client computing device 104, 108 to interact with the media server 102 so that the user is able to browse, search, preview or buy media items that are available (e.g., for purchase) at the online media store hosted by the media server 102. In the case of previewing of a video (i.e., video media item), the preview of the video can be performed by the media management application 112. Generally, the user of the client computing device 104, 108 requests to preview a particular video, and then the media management application 112 interacts with the media server 102 to receive streaming video for the preview of the particular video from the media server 102. The media management application 112 can then play the video for the preview. The video for the preview (i.e., streaming video) cab be presented on a display device associated with the client computing device 104, 108. According to one embodiment, the video for the preview can be presented in a media information window which can dynamically enlarge when a preview video is to be played. In one implementation, the dynamic enlargement of the media information window can be performed with a transition effect (e.g., animation).

Figure 2:
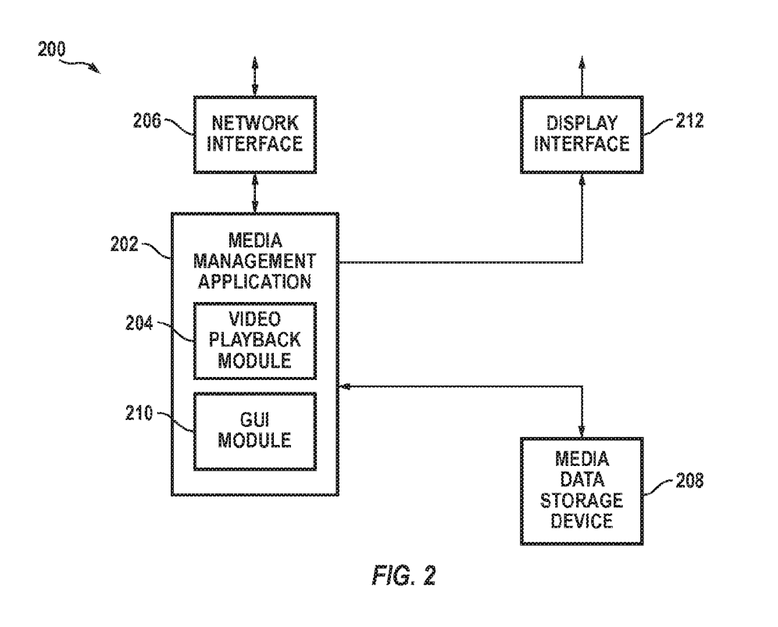
FIG. 2 is a functional block diagram of the client computing device according to one embodiment of the invention.

FIG. 2 is a functional block diagram of the client computing device 200 according to one embodiment of the invention. The client computing device 200 is, for example, suitable for use as the client computing device 104 or the client computing device 108 illustrated in FIG. 1.

The client computing device 200 includes a media management application 202. The media management application 202 allows a user of the client computing device 200 to manage various media-based operations on the client computing device 200. For example, the media management application 202 can allow a user to play back media stored at the client computing device 200. As another example, the media management application 202 can allow a user to interact with an online media store over a network so as to browse, search, buy or preview media items made available at the online media store. The media management application 202 can also allow the user to group, organize, delete or modify media items (including their metadata) stored locally at the client computing device 200, such as in a media data storage device 208.

In order to support video playback at the client computing device 200, the media management application 200 includes a video playback module 204. The video playback module 204 is utilized by the media management application 202 to play back a video at the client computing device 200. The video being played back can be a full length video or can be a short video clip. One example of a short video clip is a preview of a video. Typically, an online media store can provide previews of videos available at a media server (e.g., media server 102). For example, a preview for a video can be a portion (e.g., 30 seconds) of the video that is playable without charge to the user. The preview thus assists the user in determining whether the video is a digital media asset they would want to acquire (e.g., purchase).

The media management application 202 also includes a graphical user interface (GUI) Module 210. The GUI module 210 is utilized to output signals for a display device associated with the client computing device 200. The client computing device 200 also includes a display interface 212 to interface with the display device. The client computing device 200 can request data for the video information window from a media server (e.g., media server 102) via the network interface 206. In one embodiment, the media server provides the requested data in an XML format. The client computing device 200 can process the requested data and cause the GUI module 210 to present the video information window.

When playing back a preview for a video (i.e., when previewing a video), a video information window is modified (e.g., enlarged) to include a video playback region. The GUI module 210 can control the display interface 212 so that the display device modifies the video information window to include the video playback region. The video playback module 204 interacts with a media server (e.g., media server 102) via the network interface 206 to receive streaming video data from the media server. The streaming video data can then be output by the GUI module 210 to the display device via the display interface 212 such that the streaming video data is presented to the media playback region of the media information window. Alternatively, instead of streaming video data to the computing device 200, the preview for the video could be downloaded to the computing device 200 and then played.

Figure 3:
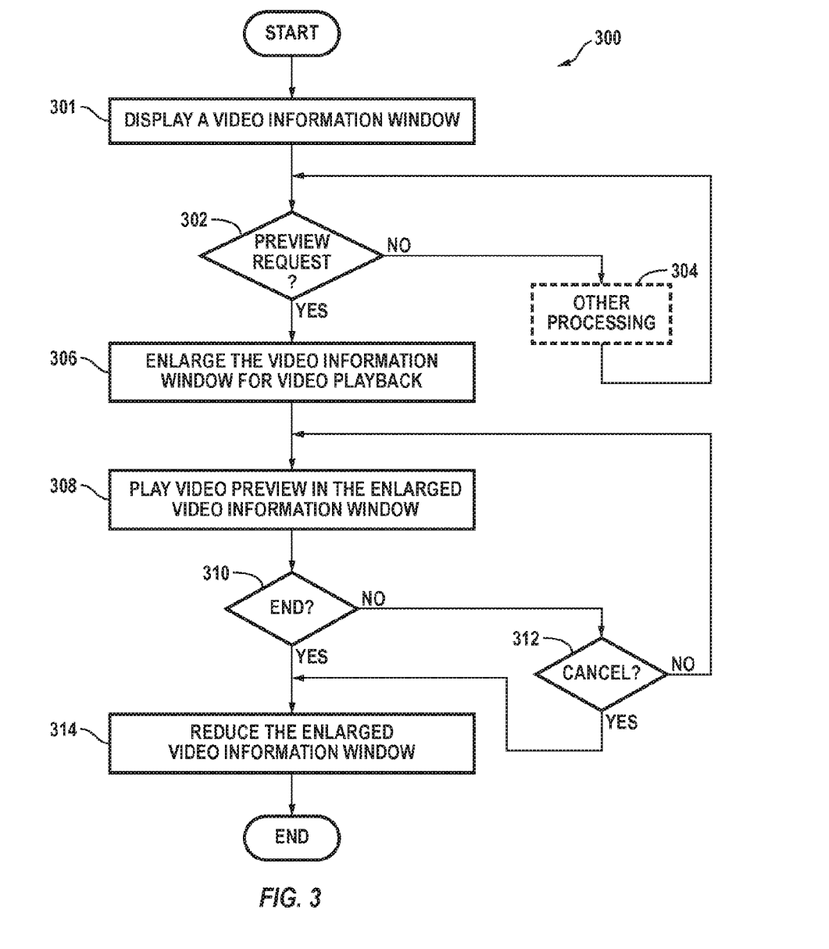
FIG. 3 is a video preview process according to one embodiment of the invention.

FIG. 3 is a video preview process 300 according to one embodiment of the invention. The video preview process 300 is, for example, performed on a client computing device, such as the client computing device 104 or the client computing device 108 illustrated in FIG. 1 or the client computing device 200 illustrated in FIG. 2.

The video preview process 300 initially displays 301 a video information window. In one embodiment, the video information window provides information concerning a video. For example, the video information window can include an image, attributes, detailed information and/or other related information pertaining to the video. The video information window can also include a preview request control (e.g., preview selector such as a virtual preview button). After the video information window is displayed 301, a decision 302 determines whether a preview request has been made. Here, a user of the client computing device can optionally request to preview a video. For example, the video can be a video being offered for purchase at a media server, and the media server can permit a preview of the video to be played without requiring purchase. When the decision 302 determines that a preview request has not been received, then other processing 304 can be performed. The other processing 304 can vary widely depending upon implementation. For example, the other processing 304 could be scrolling, browsing, searching, etc. Following the optional other processing 304, the video preview process 300 returns to repeat the block 301 and subsequent blocks.

On the other hand, when the decision 302 determines that a preview request has been received, the video information window is enlarged 306 for video playback. In one embodiment, the transition from the regular state (or mode) to the enlarged state (or mode) can utilize a transition effect (e.g., animation). The preview video (or video preview) is then played 308 in the enlarged video information window. In one embodiment, the preview video can be played 308 at full size 640×480 and full resolution. A decision 310 then determines whether the video preview process 300 should end. When the decision 310 determines that the video preview process 300 should not end, then a decision 312 determines whether the video preview process 300 should be canceled. During the playing 308 of the video preview, a cancel request can be received. The video information window can also include a cancel preview control (e.g., cancel selector such as a virtual cancel button). The cancel request can be provided by the cancel preview control. When the decision 312 determines that the video preview process 300 has not been canceled by the user of the client computing device, then the video preview process 300 returns to repeat the decision 308 and subsequent blocks so that the preview of the video can continue.

Alternatively, when the decision 310 determines that the video preview has completed, as well as when the decision 312 determines that the video preview process 300 has been canceled, the enlarged video information window is reduced 314. Typically, the reduction 314 to the enlarged video information window operates to return the video information window into the state it had prior to the enlargement 306. In doing so, in one embodiment, the transition from the enlarged state to the regular state (or reduced state) can use a transition effect (e.g., animation). Following the block 314, the video preview process 300 ends.

Figure 4A:
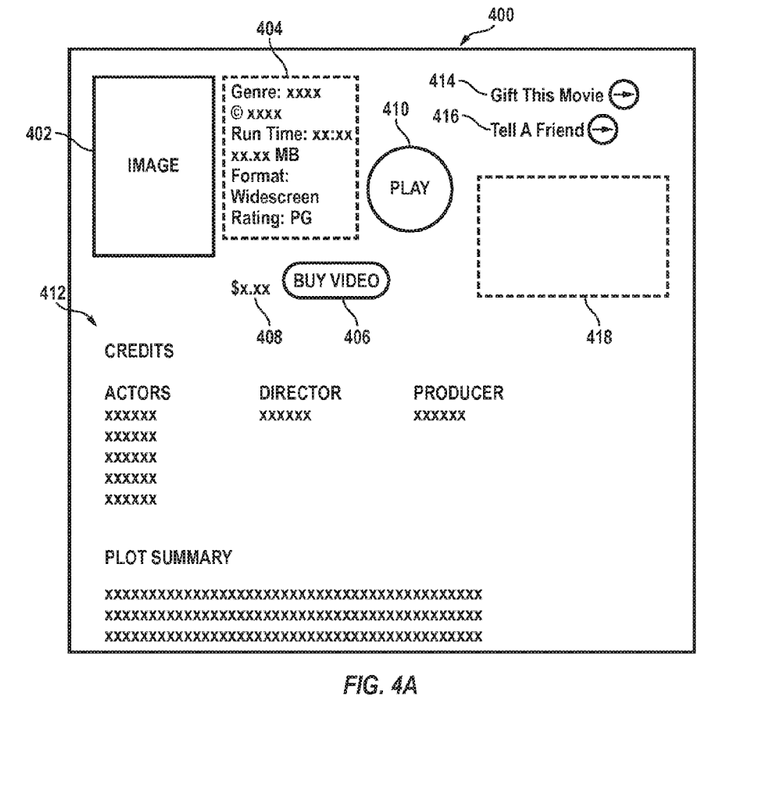
FIG. 4A is a diagram of a media information window according to one embodiment of the invention.

FIG. 4A is a diagram of a media information window 400 according to one embodiment of the invention. The media information window 400 can be presented by a client computing device on a display device associated with the client computing device. The media information window 400 pertains to a particular digital media asset. In particular, the particular digital media asset can be a video media item available from an online media store that is hosted on a remote media server.

The media information window 400 includes an image 402 that is associated with the video media item. For example, the image 402 can correspond to a cover image for the video media item. For example, when the video media item is a movie, the image 402 can pertain to an image appearing on a Digital Versatile Disc (DVD) container, poster or advertisement for the video media item. The media information window 400 also includes a video attribute area 404. The video attribute area 404 provides information on attributes of the video media item. In this example, the video attribute area 404 includes information on: genre, copyright, run time, size, format, widescreen, and rating.

The media information window 400 also includes a buy video selector 406 and a buy price 408. Upon selecting the buy video indicator 406, the video media item can be purchased from the online media store in accordance with the buy price 408. Further, the media information window 400 can present a play selector 410. Upon selection of the play selector 410, the state or mode of the media information window 400 can be altered to that shown and discussed in FIG. 4B below. The video information window 400 can also include an additional information area 412. In this example, the additional information area 412 can contain detailed information about the video media item. For example, the additional information area 412 can include various credits (attributions) concerning the video, such as actors, director and producer for the video, as well as other descriptive information, such as a plot summary for the video.

The media information window 400 can also include a link 414 (e.g., hyperlink) to enable the user to gift the video media item (e.g., movie, music video, preview for movie, preview for music video) to another, or a link 416 (e.g., hyperlink) to tell a friend about the video media item. Still further, the media information window 400 can include a related media information area 418. The related media information area 418 can contain additional information that may be of interest to users in that are interested in the video media item. For example, the related media information area 418 can display information such as recommendations of other media items that may be of interest to the user. As another example, the related information area 418 could include user review(s) for the video media item and/or other video media items with some common characteristics.

Figure 4B:
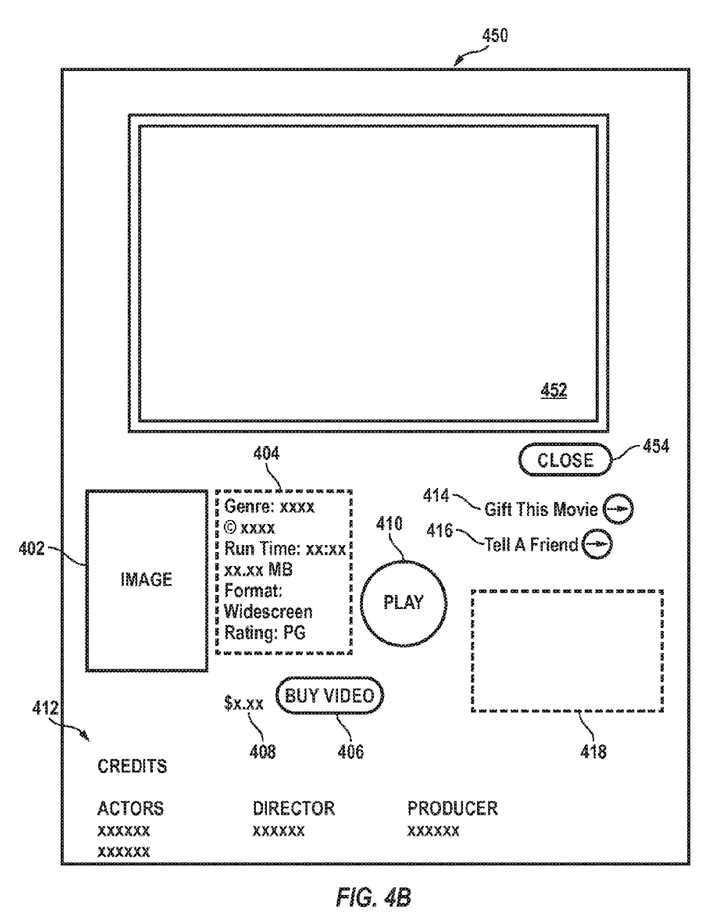
FIG. 4B is a diagram of an enlarged media information window according to one embodiment of the invention.

FIG. 4B is a diagram of an enlarged media information window 450 according to one embodiment of the invention. In this embodiment, the enlarged media information window 450 is generally a modified version of the media information window 400 illustrated in FIG. 4A. The enlarged media information window 450 includes a media playback region 452. The video media item is then played in the media playback region 452. As illustrated in FIG. 4B, the media playback region 452 can be presented at an upper portion of the enlarged media information window 450. The lower part of the enlarged media information window 450 can contain some or all the information that was previously provided in the media information window 400. The enlarged media information window 450 also includes a close selector 452 that allows the media playback region 452 to close, which removes the media playback region 452 and transitions the enlarged media information window 450 back to the media information window 400.

According to one embodiment, the relationship between the media information window 400 and the enlarged media information window 450 can be explained as follows. Presentation of media information can be done using a media information window, which has a review mode and a play mode. The media information window 400, illustrated in FIG. 4A, illustrates a review mode (or state), whereas the media information window 450 illustrated in FIG. 48 illustrates a play mode (or state). When transitioning between modes (or states), a transition effect (e.g., animation) can be used. The selection of the play selector 410 can initiate the transition from the review mode to the play mode. In one embodiment, after the transition to the play mode, the video media item can automatically begin being played in the media playback region 452. The selection of the close selector 452 can initiate the transition from the play mode to the review mode. In one embodiment, the transition from the play mode to the review mode can be automatically performed (i.e., without any specific user selection or request) when the playing of the video media item has completed.

Figure 5A:
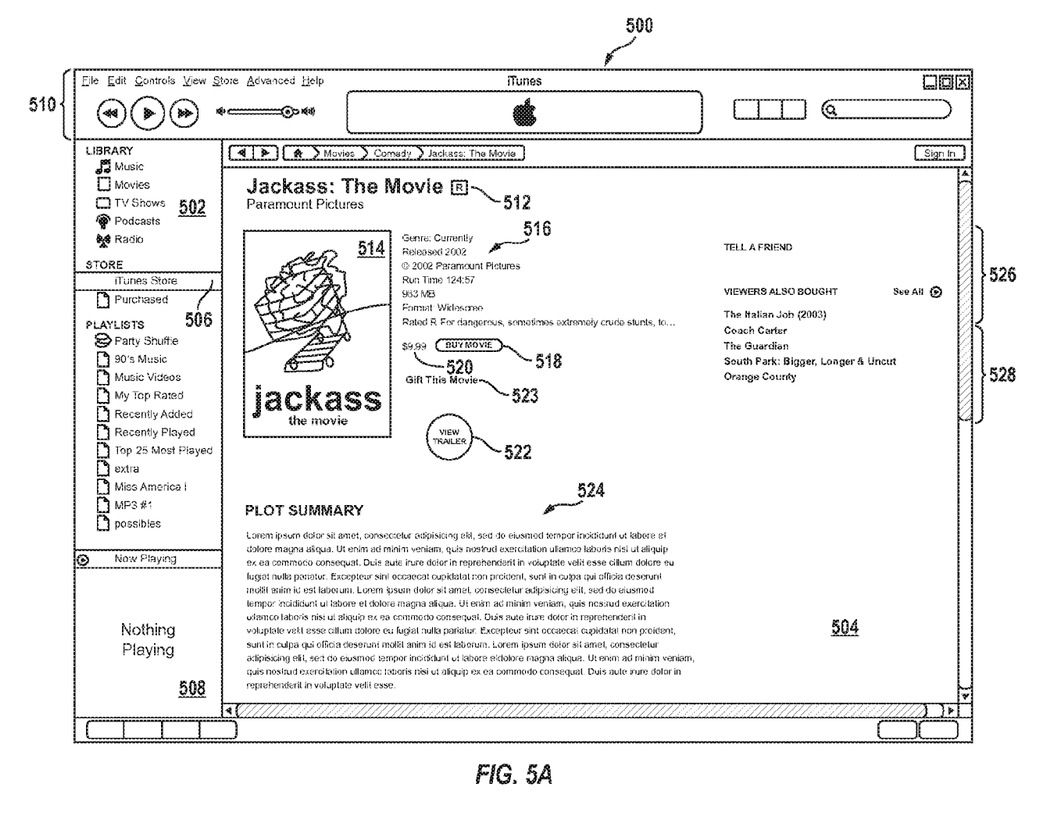
FIGS. 5A and 5B are exemplary screenshots produced by a media management application according to one embodiment of the invention.
Figure 5B:
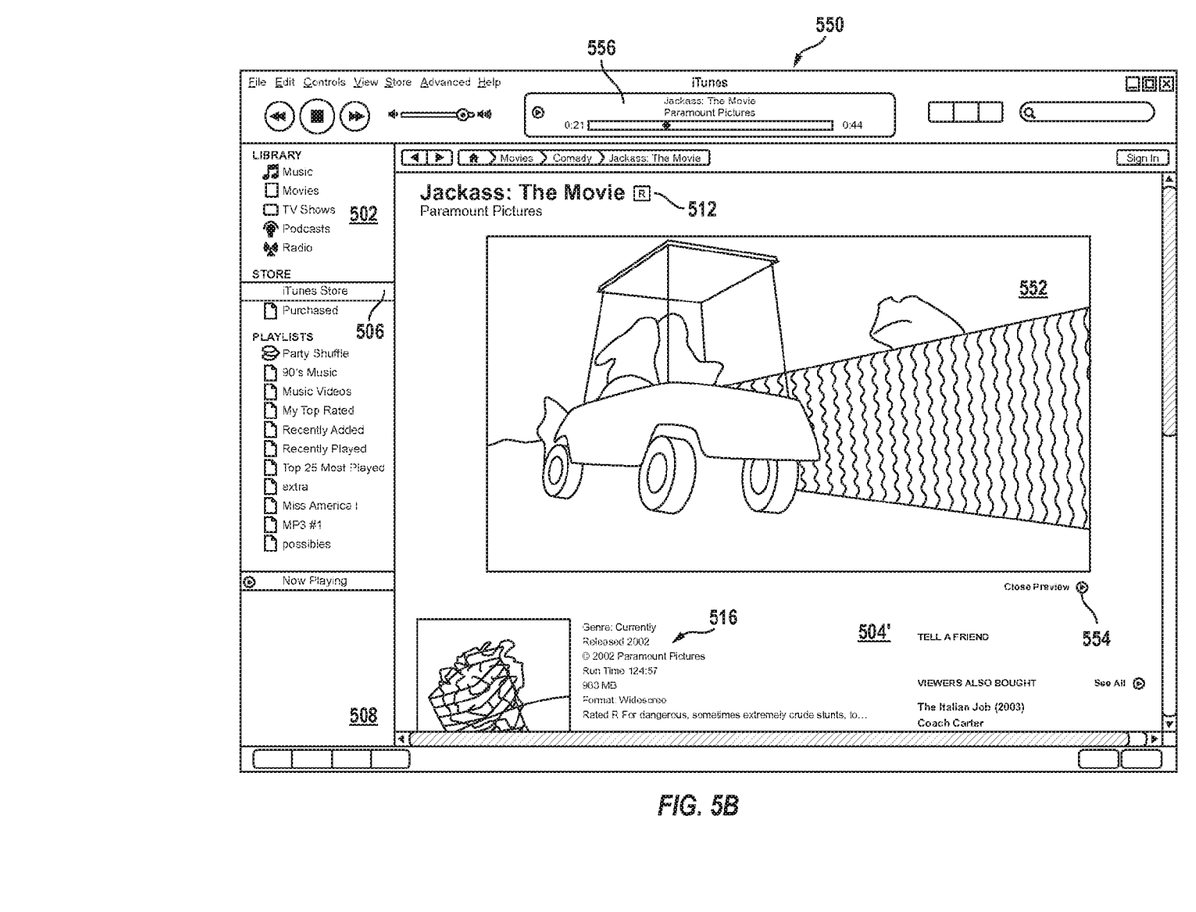

FIGS. 5A and 5B are exemplary screenshots produced by a media management application according to one embodiment of the invention. The exemplary screenshots are, for example, presented (e.g., displayed) on a display device associated with a client computing device.

More particularly, FIG. 5A illustrates a media information window 500 in a review mode (or state). The media information window 500 includes a media source region 502 where one of a plurality of available media sources can be selected, and a media information region 504 where media information pertaining to a digital media asset is illustrated. In this example, the digital media asset pertains to a video media item, namely, a movie. In the media source region 502, a particular media source entitled "iTunes Store" is shown as being selected by highlighting 506. The iTunes Store is an online media store. When the iTunes Store is highlighted 506, the media information region 504 can display information pertaining to one or more digital media assets that are available from the iTunes Store. As shown in FIG. 5A, the media information window 500 is illustrated as displaying information pertaining to a particular movie that is available from the iTunes Store. The media information window 500 also includes a "Now Playing" region 508 where text, image or video pertaining to a digital media asset being played can be presented. However, in the example illustrated in FIG. 5A, there is no digital media asset being played. A header region 510 of the media information window 500 can, for example, include command menus, payback controls, volume control, view controls, and a search dialog. The media information region 504 includes a movie title 512, an image 514, media attributes 516 (e.g., genre, release date, copyright and production company, runtime, size, format (e.g., widescreen) and rating for the movie), a "Buy Movie" button 518, a price 520, and a "View Trailer" button 522. The "View Trailer" button 522 can initiate playing of a movie trailer for the movie. A movie trailer is one form of preview for a movie. A gift control 523 (e.g., "Gift This Movie") can also be provided to enable one to gift the video media item to another. The media information region 504 can also include an additional information region 524 providing additional information concerning the movie. For example, the additional information concerning the movie can include various credits (attributions) concerning the video, such as actors, director and producer for the movie, as well as other descriptive information, such as a plot summary for the movie. Moreover, the media information region 504 can further include additional features 526 (e.g., "Tell A Friend") and a list 528 of other digital media assets that purchasers of the movie also bought. Although not illustrated in FIG. 5A, the media information region 504 could also include or link to review information from interested persons (e.g., customers).

FIG. 5B illustrates a media information window 550 in an enlarged state (or mode). In the media information window 550, a media information region 504' is enlarged (or expanded) as compared to the media information region 504 shown in FIG. 5A. The media information region 504' includes all the information that the media information region 504 includes as well as additionally includes a digital media asset playback window 552. In this example, the digital media asset playback window 552 allows playing of a movie trailer or preview of the movie that is available to be purchased. The playback can be in full resolution and proper frame size (e.g., 640×480 for VGA, 1920×1280 for HD). In cases where the movie has a widescreen format, the playing of the movie trailer or preview can also be provided in a widescreen format. A user can select a "Close Preview" control 554 to end playing of the preview for the music video. During playing, the media content can be streamed to the client computing device. The media information window 550 can also provide play information in a play information region 556. For example, the play information can display title, production company, and play progress control for the movie trailer being played.

Figure 6A:
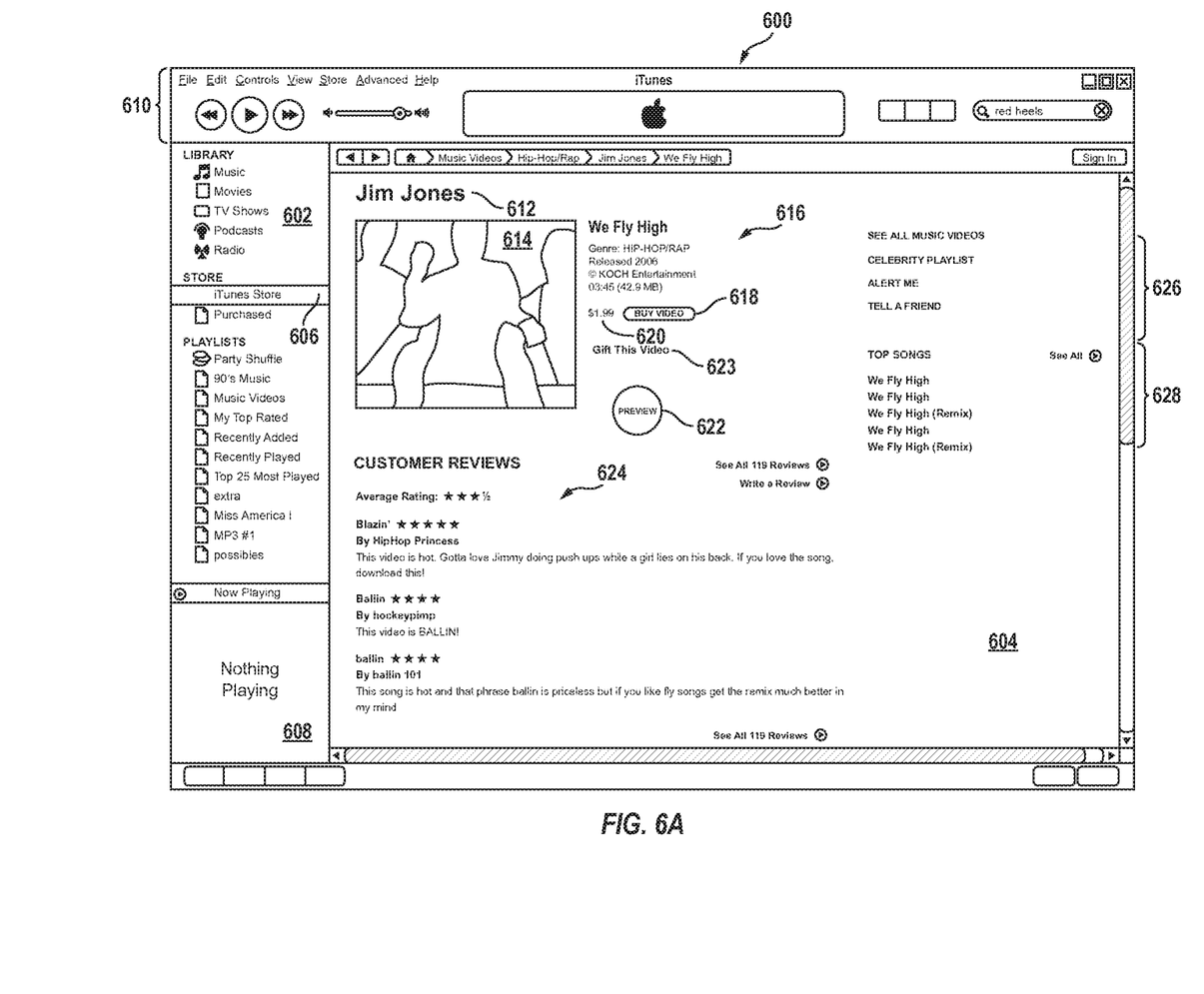
FIGS. 6A and 6B are exemplary screenshots produced by a media management application according to another embodiment of the invention.
Figure 6B:
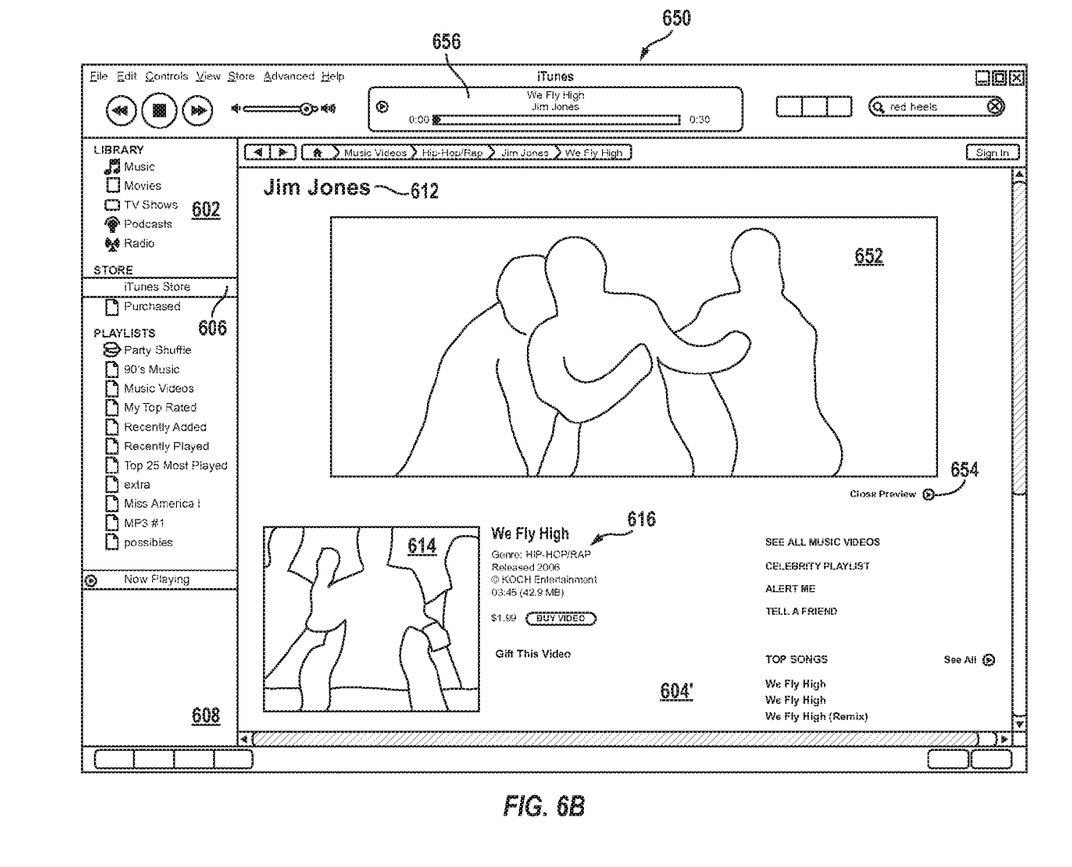

FIGS. 6A and 6B are exemplary screenshots produced by a media management application according to another embodiment of the invention. The exemplary screenshots are, for example, presented (e.g., displayed) on a display device associated with a client computing device.

More particularly, FIG. 6A illustrates a media information window 600 in a review mode (or state). The media information window 600 includes a media source region 602 where one of a plurality of available media sources can be selected, and a media information region 604 where media information pertaining to a digital media asset is illustrated. In this example, the digital media asset pertains to a video media item, namely, a music video. In the media source region 602, a particular media source entitled "iTunes Store" is shown as being selected by highlighting 606. The iTunes Store is an online media store. When the iTunes Store is highlighted 606, the media information region 604 can display information pertaining to one or more digital media assets that are available from the iTunes Store. As shown in FIG. 6A, the media information window 600 is illustrated as displaying information pertaining to a particular music video that is available from the iTunes Store. The media information window 600 also includes a "Now Playing" region 608 where text, image or video pertaining to a digital media asset being played can be presented. However, in the example illustrated in FIG. 6A, there is no digital media asset being played. A header region 610 of the media information window 600 can, for example, include command menus, payback controls, volume control, view controls, and a search dialog. The media information region 604 includes an artist identifier 612, an image 614, media attributes 616 (e.g., title, genre, copyright and recording label, duration, and size for the digital media asset), a "Buy Video" button 618, a price 620, and a "Preview" button 622. A gift control 623 (e.g., "Gift This Video") can also be provided to enable one to gift the music video to another. The media information region 604 can also include a customer review region 624 providing rating and/or review information from interested persons (e.g., customers). Moreover, the media information region 604 can further include additional features 626 (e.g., "See All Music Videos," "Celebrity Playlist," "Alert Me," and "Tell A Friend") and a list 628 of top songs of the artist.

FIG. 6B illustrates a media information window 650 in an enlarged state (or mode). In the media information window 650, a media information region 604' is enlarged (or expanded) as compared to the media information region 604 shown in FIG. 6A. The media information region 604' includes all the information that the media information region 604 as well as a digital media asset playback window 652. In this example, the digital media asset playback window 652 allows playing of a preview of the music video that is available to be purchased. The playback can be in full resolution and proper frame size (e.g., 640×480 for VGA, 1920×1280 for HD). In cases where the music video has a widescreen format, the playing of the music video can also be provided in a widescreen format A user can select a "Close Preview" control 654 to end playing of the preview for the music video. During playing, the media content can be streamed to the client computing device. The media information window 650 can also provide play information in a play information region 656. For example, the play information can display title, artist and play progress control for the music video being played.

U.S. Patent Publication No. 2004/0268451 A1 is hereby incorporated by reference herein. U.S. Patent Publication No. 2005/0021478 A1 is hereby incorporated by reference herein.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may, but need not, yield one or more of the following advantages. It should be noted that this is not an exhaustive list of advantages and there may be other or different advantages. One advantage of the invention is that an existing media information window can be enlarged when video playback is requested. The enlargement of the media information window can be animated to provide a user-friendly transition. Another advantage of the invention is that the video playback can be provided in-line with high resolution and proper frame size.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method, comprising:
    displaying, by a computing device, a review mode including a video information window having a video attribute area and an interactive preview selector, wherein the video attribute area displays attributes of a digital video asset, and wherein the interactive preview selector facilitates a preview of the digital video asset;
    receiving input corresponding to a selection of the interactive preview selector, wherein the selection causes a request for a preview of the digital video asset;
    sending a request to a media server for a preview of the digital video asset;
    receiving the video preview;
    transitioning from the review mode to a play mode, wherein transitioning includes expanding the video information window to include a media playback region in addition to the video attribute area, the interactive preview selector, and an interactive close element, wherein transitioning includes an animated effect, wherein the media playback area is provided at an upper portion of the video information window, and wherein the video attribute area is shifted downward below the media playback region in the video information window;
    displaying the play mode;
    previewing the digital asset in the media playback region during the play mode; and
    transitioning from the play mode to the review mode when the preview ends, wherein transitioning includes reducing the video information window to include the video attribute area and the interactive preview selector, and wherein transitioning from the play mode to the review mode includes removing the interactive close element.

2. The method of claim 1, wherein the video preview is a streaming video preview.

3. The method of claim 1, further comprising receiving input corresponding to a selection of the interactive close element, wherein the selection causes transitioning from the play mode to the review mode.

4. A computer-implemented system, comprising:
    one or more processors:
    one or more non-transitory computer-readable storage mediums containing instructions configured to cause the one or more processors to perform operations including:
    displaying a review mode including a video information window having a video attribute area and an interactive preview selector, wherein the video attribute area displays attributes of a digital video asset, and wherein the interactive preview selector facilitates a preview of the digital video asset;
    receiving input corresponding to a selection of the interactive preview selector, wherein the selection causes a request for a preview of the digital video asset;
    sending a request to a media server for a preview of the digital video asset;
    receiving the video preview;

transitioning from the review mode to a play mode, wherein transitioning includes expanding the video information window to include a media playback region in addition to the video attribute area, the interactive preview selector, and an interactive close element, wherein transitioning includes an animated effect, wherein the media playback area is provided at an upper portion of the video information window, and wherein the video attribute area is shifted downward below the media playback region in the video information window;

displaying the play mode;

previewing the digital asset in the media playback region during the play mode; and transitioning from the play mode to the review mode when the preview ends, wherein transitioning includes reducing the video information window to include the video attribute area and the interactive preview selector, and wherein transitioning from the play mode to the review mode includes removing the interactive close element.

5. The system of claim 4, wherein the video preview is a streaming video preview.

6. The system of claim 4, further including instructions configured to cause the one or more processors to perform operations including:

receiving input corresponding to a selection of the interactive close element, wherein the selection causes transitioning from the play mode to the review mode.

7. A non-transitory computer-program product, tangibly embodied in a machine-readable non-transitory storage medium, including instructions configured to cause a data processing apparatus to:

display a review mode including a video information window having a video attribute area and an interactive preview selector, wherein the video attribute area displays attributes of a digital video asset, and wherein the interactive preview selector facilitates a preview of the digital video asset;

receive input corresponding to a selection of the interactive preview selector, wherein the selection causes a request for a preview of the digital video asset;

send a request to a media server for a preview of the digital video asset; receive the video preview;

transition from the review mode to a play mode, wherein transitioning includes expanding the video information window to include a media playback region in addition to the video attribute area, the interactive preview selector, and an interactive close element, wherein transitioning includes an animated effect, wherein the media playback area is provided at an upper portion of the video information window, and wherein the video attribute area is shifted downward below the media playback region in the video information window;

display the play mode;

preview the digital asset in the media playback region during the play mode;

transition from the play mode to the review mode when the preview ends, wherein transitioning includes reducing the video information window to include the video attribute area and the interactive preview selector, and wherein transitioning from the play mode to the review mode includes removing the interactive close element.

8. The computer-program product of claim 7, wherein the video preview is a streaming video preview.

9. The computer-program product of claim 7, further comprising instructions configured to cause a data processing apparatus to:

receive input corresponding to a selection of the interactive close element, wherein the selection causes transitioning from the play mode to the review mode.

\* \* \* \* \*